United States Patent
Turner

(10) Patent No.: US 6,181,092 B1
(45) Date of Patent: Jan. 30, 2001

(54) CURRENT CONTROL CIRCUIT FOR A RELUCTANCE MACHINE

(75) Inventor: Michael James Turner, Leeds (GB)

(73) Assignee: Switched Reluctance Drives, Limited, England (GB)

( * ) Notice: Under 35 U.S.C. 154(b), the term of this patent shall be extended for 0 days.

(21) Appl. No.: 08/734,241

(22) Filed: Oct. 15, 1996

(30) Foreign Application Priority Data

Oct. 18, 1995 (GB) .................................................. 9521332

(51) Int. Cl.[7] ................................................. H02K 23/00
(52) U.S. Cl. ........................................... 318/254; 318/701
(58) Field of Search ................................. 318/701, 254, 318/798–811

(56) References Cited

U.S. PATENT DOCUMENTS

| | | | |
|---|---|---|---|
| 4,208,621 | * 6/1980 | Hipkins et al. | 318/138 |
| 4,400,654 | * 8/1983 | Elliott | 318/254 |
| 4,549,120 | * 10/1985 | Banno et al. | 318/254 |
| 5,463,299 | * 10/1995 | Futami et al. | 318/618 |
| 5,663,618 | * 9/1997 | Adachi et al. | 318/254 |

FOREIGN PATENT DOCUMENTS 0 635 931    1/1995    (EP) .................................. H02P/7/05

OTHER PUBLICATIONS

Abstract of Japanese Patent No. 05–022941 of Jan. 29, 1993, *Patent Abstracts of Japan*, Jun. 11, 1993, vol. 17 No. 307 (E–1379).

Unitrode Integrated Circuits, "Application Note U–97: Modelling, Analysis and Compensation of the Current–Mode Converter," pp. 9–52 to 9–57, 1979.

* cited by examiner

*Primary Examiner*—David S. Martin

(57) ABSTRACT

A current controller for a switched reluctance machine is disclosed. The current controller controls the switching frequency of the power devices that control the energization of the phase windings of the machine and the peak magnitude of the phase current in response to a single pulse width modulated signal. Also disclosed is a method and circuit for implementing slope compensation in a current controller for a switched reluctance machine where the magnitude of the slope compensation is proportional to the voltage of the power supply from which the phase windings are energized.

17 Claims, 11 Drawing Sheets

US 6,181,092 B1

CURRENT CONTROL CIRCUIT FOR A RELUCTANCE MACHINE

FIELD OF THE INVENTION

This invention relates to control circuits for reluctance machines and more particularly, but not exclusively, to control circuits for switched reluctance machines. In particular, the present invention relates to an improved control circuit for a switched reluctance machine in which a pulse width modulated signal is used to control both the average magnitude of the current in the phase winding and the frequency at which the power switching devices coupled to the phase windings are switched.

BACKGROUND OF THE INVENTION

In many prior art motor control systems, pulse width modulated (or "PWM") control signals are used to provide signals indicative of the desired speed or torque of the motor. In known control systems, the PWM signal is often used to provide a signal representative of the magnitude of an analog quantity. PWM reference signals are used because they are easily generated by digital circuits, such as ASICs, microprocessors and the like, that are used in modern control systems. Furthermore, the digital nature of a PWM signal means that it can easily be passed across an isolation barrier (e.g. using optical means) with minimal corruption.

In many known current control systems, current feedback is used to maintain the desired motor current and operate the power switching circuits. In these systems, the power switches are typically operated such that the motor current is proportional to an analogue current reference signal. This reference may conveniently originate as a digital PWM signal in an ASIC or microprocessor, the required analogue voltage being obtained by low-pass filtering. One exemplary current controlled system of this type for a switched reluctance machine is illustrated in FIG. 1.

FIG. 1 generally illustrates a current control circuit for a single phase of a switched reluctance machine. As those working in the area of switched reluctance motor and control circuit design will recognize, the illustrated circuitry will typically be repeated for each phase of the machine. For the sake of clarity, not all the details of the circuit components are shown. These, however, would be readily assumed by one skilled in the art.

In the circuitry illustrated in FIG. 1, a relatively low voltage PWM current reference signal representing the desired magnitude of the peak motor phase current is received at node 10. This signal is typically generated by an ASIC, microprocessor or similar digital control circuit. In many prior art applications, the frequency of the pulses that comprise the relatively low voltage PWM current reference signal is constant, e.g., 16 kHz, and the width of the pulses is varied in proportion to the desired current. Typically, the width of the pulses comprising the low voltage PWM current reference signal is adjusted such that the average value of the PWM current reference signal (i.e., its DC component) represents the magnitude of the desired peak phase current.

The electrical components in most known motor control systems can be divided into two groups: control electronics and power electronics. The control electronics typically generate the control signals for the motor and normally operate on and from relatively low voltage signals and supplies (up to 25 Volts). Nevertheless, because of the need to couple elements of the control circuitry to the high-voltage power electronics, some of the control components may operate at high common mode voltages. The power electronics typically control the application of electric power to the motor and operate on and from voltages that may range into the hundreds of volts. In FIG. 1, the components within the broken line box comprise the power electronics and those components of the control electronics which are at high common mode voltages.

To prevent the high voltages and currents associated with the power electronics from interfering with the control electronics, and to isolate the user (who may come into contact with the control electronics) from dangerous voltages, many known circuits use elements known as "isolators", such as opto-isolators. These isolators provide a barrier between those components at high common mode potential and the remainder of the system. One such isolator is illustrated as element 15 in FIG. 1. It will be understood that means other than optical could be used, e.g. transformer isolation.

Referring to the circuitry of FIG. 1, the PWM reference signal is transmitted across the isolator 15 to the high voltage power electronics portion of the circuit. The filtering network 12 converts the PWM current reference signal into an analog voltage signal which varies in direct relation to the width of the pulses that comprise the PWM reference current signal. The analog signal from filter 12 corresponds to the peak magnitude of the desired current. That signal is applied as one input to a comparator 16. The other input to comparator 16 is a voltage taken from a first terminal of a resistor 17 that is placed in series with switching devices 8 and 23 and phase winding 24. When switching devices 8 and 23 are closed, the phase winding 24 is coupled to a power source with a voltage +V and current will flow through the phase winding 24. The voltage at the first terminal of resistor 17 corresponds to and follows the magnitude of the current in the phase winding 24.

Comparator 16 compares the voltage from filter 12 (which corresponds to the desired current) with the voltage at the first terminal of resistor 17 (which corresponds to the phase current) and generates an output signal that indicates whether the sensed phase current is greater than or less than the desired current. The output signal from comparator 16 is then transmitted back across the isolation barrier by isolator 18 and is applied as one input to a three-input AND gate 21 and as one input to a minimum off-timer 20. The minimum off-timer 20 is an electronic timing device that produces a logic low signal at its output for a predetermined period of time in response to a change in its input from a logic high value to a logic low value. After the predetermined time has passed, the output of the minimum off-timer 20 will rise to a logic high signal.

The output of comparator 16, minimum off-timer 20 and AND gate 21 operate together to control the current in the phase winding 24 as follows. When it is appropriate to energize the phase winding 24, an enable signal is provided as one input to the three-input AND gate 21. Typically, at the time the enable signal is provided, the other two inputs to the AND gate 21 will also be logic high. Accordingly, the output of logic gate 21 will be logic high. This logic high signal is then transmitted across the isolation barrier by isolator 22 and that signal turns ON switching devices 8 and 23, coupling the phase winding 24 to the power source +V. At this time the current in the phase winding 24 will begin to rise and the voltage at the first terminal of resistor 17 will begin to increase. When comparator 16 determines that the current in the phase winding is greater than the desired current, it will produce a logic low signal that, when transmitted across the isolation barrier by isolation device 18, will both render the output of AND gate 21 a logic low (thus turning off switching devices 8 and 23) and render the output of the minimum off-timer 20 logic low for the predetermined period of time. After the minimum off-timer times out (typically after 20–30 microseconds) the current in the phase winding typically will have dropped below the desired current, and the cycle will repeat during the period the enable signal for the appropriate phase is logic high.

While the known circuitry of FIG. 1 can be used to control a switched reluctance machine, it suffers from several disadvantages. For example, because of the need to isolate part of the control circuitry from the power circuitry, the control system illustrated in FIG. 1 requires three isolating devices 15, 18 and 22 for each phase of the machine. These isolation devices are often relatively expensive compared to the rest of the control system and can add undesirable cost to the motor controller. Further, because of the need to limit the chopping frequency of the switching devices 8 and 23, the circuit illustrated in FIG. 1 requires a minimum off-timer 20 or similar device. The need for an off-timer 20 for each phase also adds cost to known control systems. Still further, in control circuits like the one illustrated in FIG. 1, the switching, or "chopping", frequency is not constant, but varies with the inductance of the load 24, the supply voltage V, and (since the impedance of the load 24 will in practice have a resistive component) the actual current level. If an inaudible (ultrasonic) chopping frequency is required, as is often the case, the minimum-off periods timed by 20 must be chosen such that the lowest chopping frequency is still ultrasonic. The average switching frequency will be higher than this, and therefore the frequency-related losses in the power electronics (e.g. switching losses in switches 8 and 23) and possibly the load 24 (iron losses, skin effect in the winding) will be worse than absolutely necessary. Additionally, because the chopping frequency is not constant, but varies as the measured current and desired current vary the different phase control circuits for the individual phases in the machine can operate such that, at a given instant, the switching of the devices 8 and 23 for the different phases occurs at different frequencies. When the switching devices of the different phases are chopped at different frequencies, undesirable audible noise is often produced by the interaction or "beating" of the different chopping frequencies, even if the individual phases are all switching ultrasonically.

A further disadvantage of the circuitry of FIG. 1 is that it is subject to potentially damaging currents in the event of a failure of the digital circuit that provides the PWM signal to node 10. For example, if there was a failure in the digital device that provides the PWM signal such that the signal applied to node 10 was always at the highest logic level, the analog filter 12 would produce an analog signal corresponding to a 100% duty cycle which will ensure that the maximum phase current is provided. The application of such a high phase current for any significant length of time could damage the machine. Worse still, the failure of isolator 18, or of isolator 22 with its output in the logic HIGH state, would result in switching devices 8 and 23 being permanently closed, and the winding current consequently rising without limit.

An alternative current controller is illustrated in FIG. 2. In the control circuit of FIG. 2, as in the circuit of FIG. 1, a low voltage PWM signal representing the desired current is received at node 10 and converted by a filter 12' into a low voltage analog signal having a magnitude that varies with the duty cycle of the PWM command signal. The low voltage analog signal from filter 12' is provided to the non-inverting input terminal of a comparator 26. Also coupled to the non-inverting input terminal of the comparator 26 is a feedback signal derived from the output of the comparator 26 by feedback resistor 27. As those skilled in the art will recognize, feedback resistor 27 introduces hysteresis into the comparison, converting comparator 26 into a hysteresis comparator. The level of the hysteresis is determined by the size of resistors 27 and 29.

Coupled to the inverting input of comparator 26 is the output of a current transducer 28. Current transducer 28 is located near the phase winding 24 and provides an isolated analog voltage signal that corresponds to the magnitude of the current flowing in winding 24. The output of the comparator 26 is coupled to the control gates of switching devices 8 and 23 through an isolator 15' to control the application of voltage to the machine winding 24.

In general, the output of comparator 26 will produce a logic high signal whenever the analog voltage representing the current in the winding 24 is less than the analog voltage from filter 12' representing the desired current. Once the analog voltage representing the actual current exceeds the analog voltage representing the desired current, the output of comparator 26 will drop to logic low, opening switches 8 and 23 and allowing the machine current to drop. Once the analog voltage representing the desired voltage falls below the analog voltage representing the desired current by an amount determined by feedback resistor 27 and input resistor 29, the output of the comparator 26 will change again and the cycle will repeat.

While control circuits like the one illustrated in FIG. 2 overcome some of the limitations of circuits such as are illustrated in FIG. 1, they still suffer from several disadvantages. For example, in the circuitry of FIG. 2 the switching of switching devices 8 and 23 does not occur at any set frequency, and the switching of the devices may thus not be the same for all of the phases of a reluctance machine. As discussed above in connection with FIG. 1, these differing frequencies can result in higher than necessary switching frequencies, as well as undesirable audible noise and a switching scheme that is undesirable in that, for optimum machine control, it is desirable to be able to control the swiching of the switching devices associated with the phase windings. Still further, the circuit of FIG. 2 can suffer from the continued application of unusually high phase currents in the event that the digital device providing the PWM signal fails and provides a continuous high voltage signal to node 10. In addition, an isolated current transducer is required which, as those skilled in the art will readily recognize, is a relatively expensive item and may require considerable space for installation.

Control circuits have been suggested that allow for control of the switching frequency of the power switching devices 8 and 23. One such control system is disclosed in FIG. 3A. In the control system of FIG. 3A, as in the other systems discussed above, a PWM current reference signal is received at 10 by a filter 12" that converts the PWM current reference signal into an analog signal whose magnitude varies with the duty cycle of the PWM command signal. The analog control signal is applied to one input of an error amplifier 30. The other input to the amplifier 30 is an analog signal that constitutes the output of a low pass filter 31 that receives and averages an analog voltage corresponding to the current in the phase winding of the machine. This analogue voltage is derived from an isolated current transducer 28. The low pass filter 31 detects and averages the current flowing through the phase winding and provides an analog voltage signal corresponding to the magnitude of the current. The output of the error amplifier 30 is an analog error signal that varies with the difference between the analog signal representing the desired current and the analog signal representing the averaged measured current.

The analog error output from amplifier 30 is provided to one input of a low voltage digital comparator 33. The other input to digital comparator 33 is a repetitive low voltage waveform 34 such as a sawtooth or triangular waveform having a frequency that may be adjusted by additional control circuitry (not shown). The output of digital comparator 33 is a PWM signal whose duty cycle varies in proportion to the magnitude of the error signal from amplifier 30. This PWM signal is passed through isolator 15" to the switching devices 8 and 23.

It will be recognized by those skilled in the art that various modifications are possible to this basic circuit.

There are several disadvantages associated with the circuitry of FIG. 3A. One disadvantage is that it is slow. In particular, the need for the low pass filter 31 prevents the circuit from rapidly responding to changes in either the actual or desired machine current. Moreover, the circuit is relatively complex in that it requires the ramp signal 34 and two comparators 30 and 33. Further, it requires an isolated current transducer.

A further known current control scheme using simple current measurement and fixed switching frequency is shown in FIG. 3B. This attempts to overcome some of the difficulties associated with these schemes shown in FIGS. 1 and 2 and 3A. In this circuit, the PWM signal representing the desired current level is received at 10 and passed through an isolator 15 to a filter circuit 12 (as before). The output of the filter circuit is passed to a voltage comparator 33, the other input of which is driven by a signal from a current sensing resistor 17. The output of comparator 33 is connected to the reset input of a flip-flop 35. The set input of the flip-flop is connected to a clock signal through another isolator 37. The output of the flip-flop is used to drive the devices 8 and 23 as previously described.

At the start of a switching interval, flip-flop 35 is set by the clock signal and closes the switches building up current in the phase winding. When the load current reaches the desired value as represented by filter 12, the output of comparator of 33 resets the flip-flop, thereby opening the switches and allowing the current to fall until the next clock edge is received and the sequence repeats.

Known variants on this basic circuit have the clock oscillator inside the isolating barrier (thereby eliminating isolator 37) or use a third isolator with the flip-flop outside the barrier.

As those skilled in the art will appreciate, when the PWM duty cycle of the switching device is above 50% there is a danger that an induced error in the measured or desired current signals will increase over time and cause chaotic behavior and/or subharmonic oscillation. Slope compensation has been suggested for reducing the risk of instabilities in current controllers. Slope compensation is generally known and is discussed, for example, in UNITRODE's Application Note U-97, "Modeling, Analysis and Compensation of the Current-Mode Converter" (available from Unitrode Integrated Circuits Corp.)

However, this system still has disadvantages in that it requires a minimum of two isolators or one isolator together with a clock oscillator on the "live" side of the circuitry. Further, it requires a separate clock signal and PWM control signal, which (notably if a separate clock generator is used on the "live" side of the circuit, so as to avoid two isolators) may not be of exactly the same frequency. This may result in audible noise due to intermodulation between the clock and any residual ripple (at PWM frequency) at the output of filter 12. Nor does the circuit of FIG. 3B overcome the aforementioned problems of failure of the digital device supplying the PWM signal to node 10.

The control system of the present invention overcomes the discussed, and other, disadvantages of known control systems that receive a PWM current reference signal and provides additional benefits unavailable in the known systems. In a particular form the present invention also provides an improved current controller with slope compensation.

SUMMARY OF THE INVENTION

The control system of the present invention can make use of both the frequency component of a PWM command signal (i.e., the AC component) and the average voltage component (i.e., the DC component) to provide a control system that fixes the switching frequency, thereby reducing the problems of "beat" frequencies and provides a simple and cost effective way to control the current and switching of switching devices in a switched reluctance machine. In the present invention, the frequency at which the current controller switches the power switching devices follows the frequency of the of the PWM command signal. Further, the peak winding current follows the average (DC) value of the PWM command signal. In one embodiment, slope compensation is added to improve the performance of the current controller of the present invention. In a further embodiment, a single isolation channel is used to isolate the current controller from the PWM command signal.

BRIEF DESCRIPTION OF THE DRAWINGS

Other aspects and advantages of the present invention will become apparent upon reading the following detailed description of examples of the invention and upon reference to the drawings in which.

Similar reference characters indicate similar parts throughout the several views of the drawings.

DETAILED DESCRIPTION OF THE INVENTION

Figure 1:
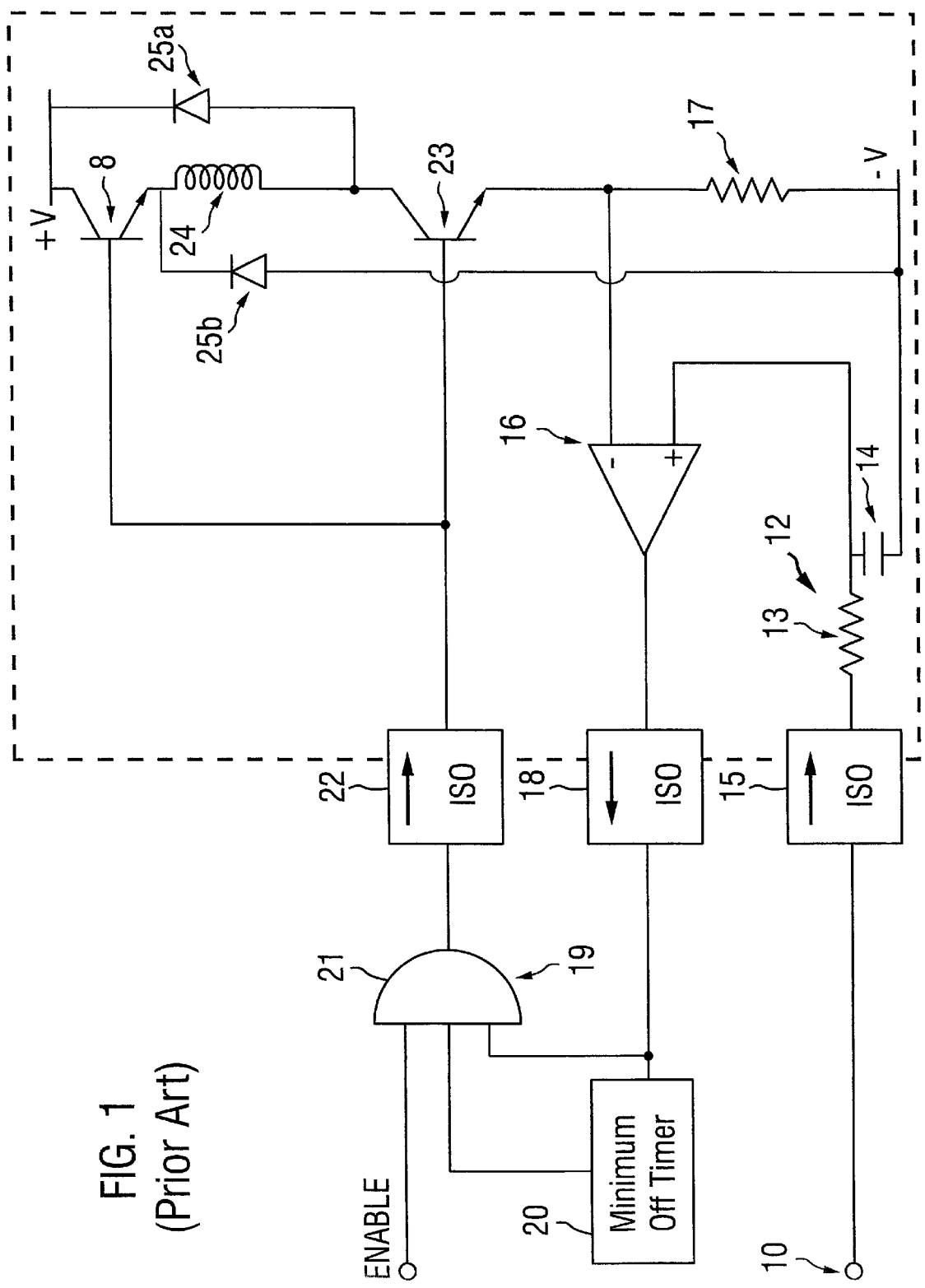
FIG. 1 illustrates a known current controlled system for a single phase of a switched reluctance motor in which current feedback and a minimum off-timer is used to control the current in the phase windings of the motor.
Figure 2:
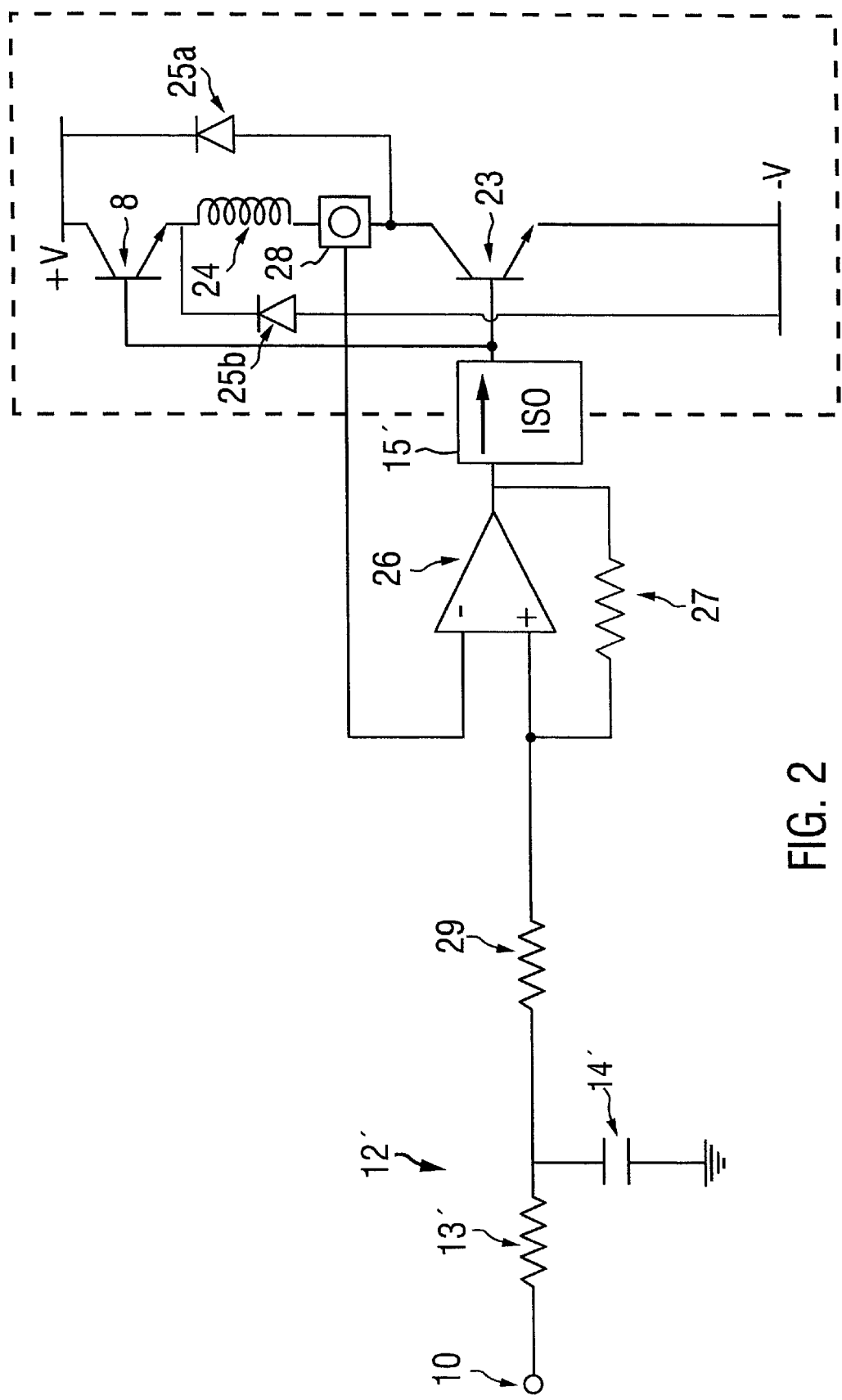
FIG. 2 illustrates a known current controller in which a hysteresis comparator is used to control the current in the phase windings of the motor.
Figure 3A:
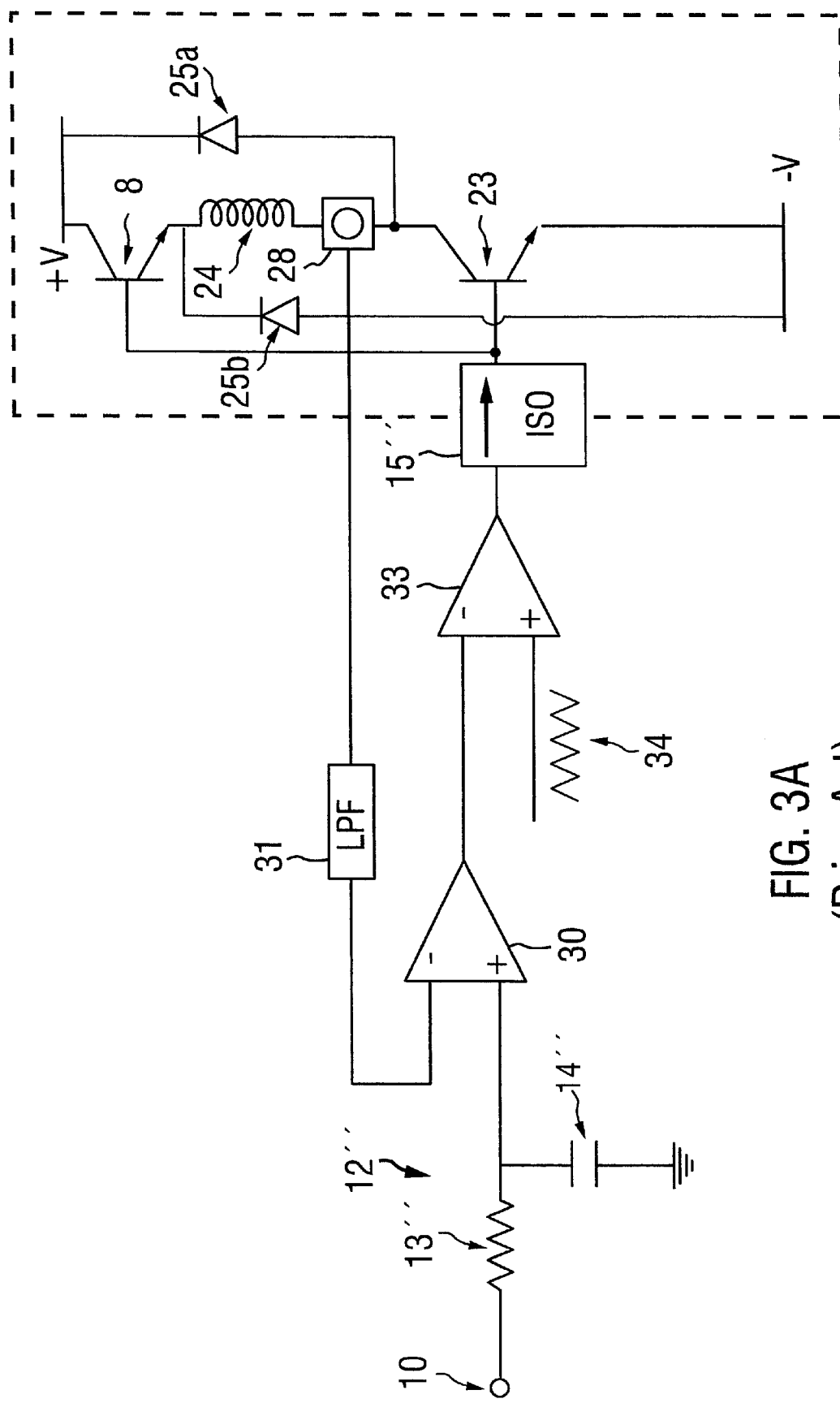
FIGS. 3A and 3B illustrate known current controllers that allow for control of the switching frequency of the power switching devices that couple the phase windings to a voltage source.
Figure 3B:
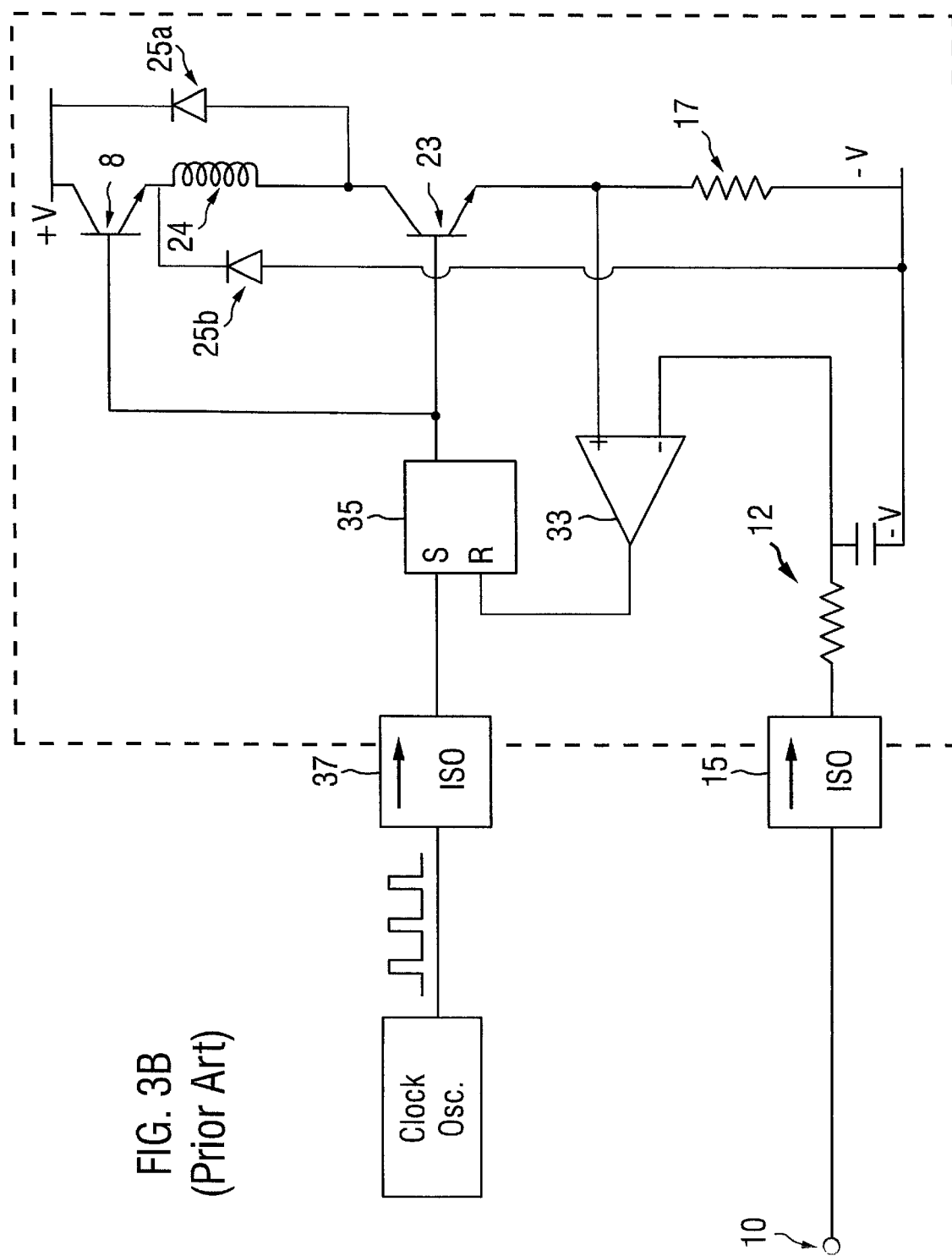
Figure 4:
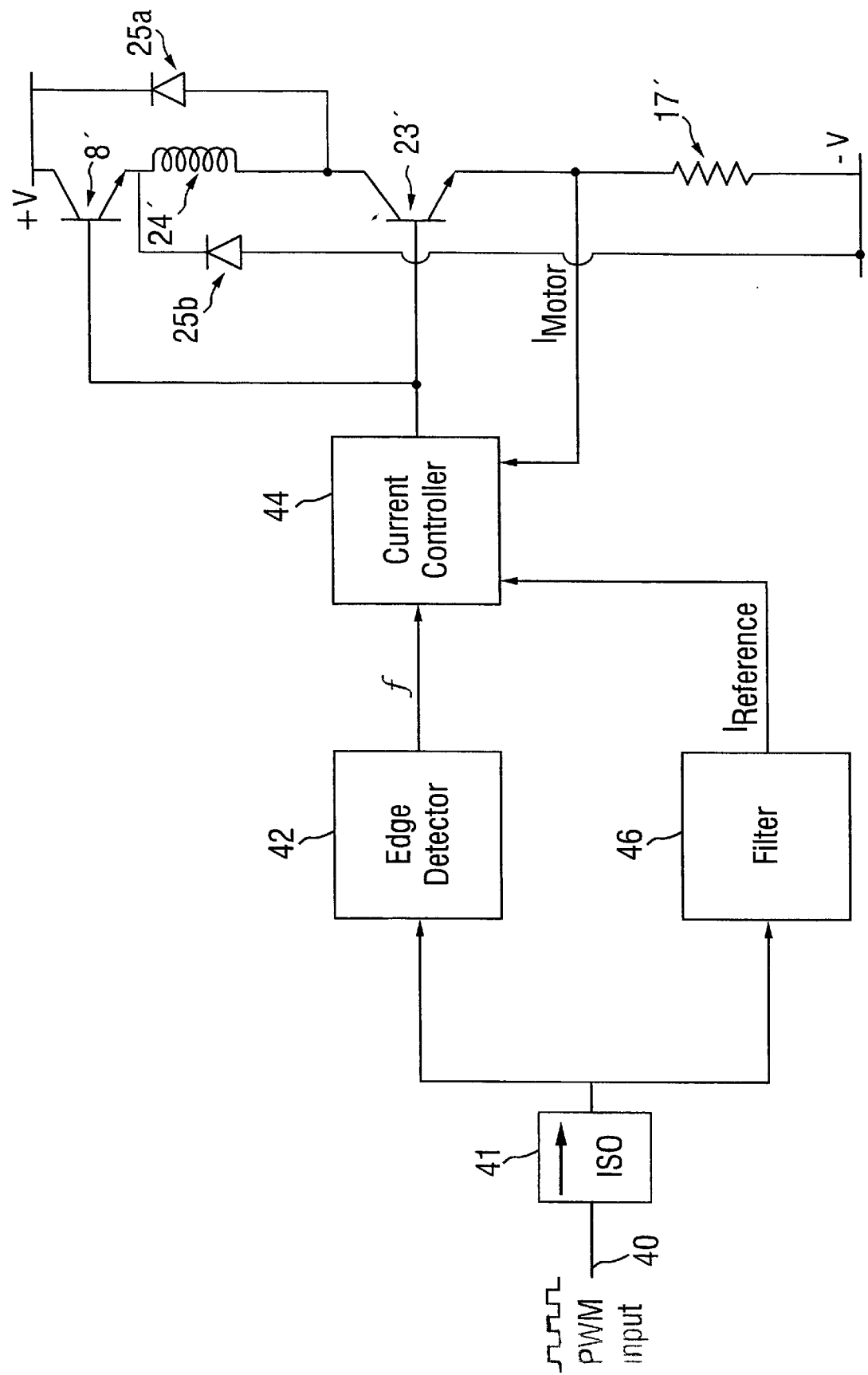
FIG. 4 illustrates in block schematic form a controller constructed in accordance with the present invention.

FIG. 4 illustrates in block schematic form a control circuit constructed in accordance with the present invention. In general, the circuit represented by FIG. 4 includes a circuit for receiving a PWM signal at node 40 that contains information concerning the magnitude of the desired phase current and information concerning the desired switching frequency of the power switching devices 8' and 23'. In the circuit of FIG. 4 the PWM input signal received at node 40 serves a dual purpose: (i) its average voltage value (i.e. its DC component) is used to control the magnitude of the phase current and; (ii) its frequency is used to control the switching frequency of switching devices 8' and 23'.

In the circuit of FIG. 4, the PWM signal received at node 40 is applied through an isolator 41 to a low pass filter 46 and to an edge detector 42. Edge detector 42 responds to the rising or falling edges of the PWM signal received at node 40 to produce a digital train that has clock pulses that occur at a frequency that is equal to the frequency of the PWM signal received at node 40. The digital pulse train from the edge detector 42 is provided as a clock input to current controller 44 to control the switching of the switching devices 8' and 23'.

Current controller 44 receives three inputs: the digital pulse train from edge detector 42, an analog voltage signal corresponding to the magnitude of the current in the phase winding 24' ($I_{MOTOR}$) and an analog voltage signal corresponding to the magnitude of the desired phase current ($I_{REFERENCE}$). In general, current controller 44 switches switching devices 8' and 23' ON each time it receives a pulse from edge detector 42 thus coupling the phase winding 24' to the power supply voltage +V. Controller 44 keeps switching devices 8' and 23' ON, and allows the current in the phase winding 24' to increase, until the current in the phase winding, as represented by $I_{MOTOR}$, exceeds the desired phase current value $I_{REFERENCE}$.

In the embodiment of FIG. 4, the analog voltage signal corresponding to the magnitude of the phase current in the windings $I_{MOTOR}$ is derived through the use of a resistor 17' placed in series with switching devices 8' and 23' and phase winding 24'. Alternative arrangements for sensing the phase current $I_{MOTOR}$, such as a current transducer or a device with a built-in current measuring system (e.g. a SENSEFET manufactured by International Rectifier of El Segundo, Calif., USA) may be used.

The analog voltage signal corresponding to the magnitude of the desired phase current $I_{REFERENCE}$ is derived from the low pass filter 46 that receives as its input the PWM input signal received at node 40. Low pass filter 46 receives the PWM input signal and develops an analog voltage signal that is proportional to the duty cycle of the PWM signal received at node 40. In the embodiment of FIG. 4, the analog voltage signal produced by filter 46 $I_{REFERENCE}$ is equal to the average DC value of the PWM signal received at node 40.

As an analysis of FIG. 4 reveals, the control circuit of the present invention allows for the control of both the magnitude of the phase current and the switching frequency of power devices 8' and 23' from a single PWM input signal. Those skilled in the art will recognize that the control circuit of FIG. 4 is exemplary only and that other circuit implementations may be used without departing from the scope of the present invention. For example, edge detector 42 could be designed to produce pulses in response to either the rising or falling edges of the PWM signal received at node 10, and the analog voltage representing the phase current $I_{MOTOR}$ could be derived through the use of a current transducer or other current sensing device. Those skilled in the art will also recognize that while the circuitry of FIG. 4 is illustrated for only one phase, the control circuit of the present invention is applicable to multi-phase machines. In embodiments where multi-phase motors are used, a separate current controller 44 should be provided for each phase. Furthermore, the circuit could be made to operate with the lower bound of the phase current controlled. In this case, current controller 44 operates so that the switching devices 8' and 23' are turned OFF (i.e. opened) when a pulse is received from the edge detector 42. The phase current in the load 24' then decreases until it falls below the desired value $I_{REFERENCE}$, when the switches 8' and 23' are closed, coupling the winding 24' to the power supply. The phase current then rises until the next PWM edge is detected by edge detector 42, when the cycle repeats.

The invention can also be used with only one of the two power switches operated by the current controller 44. In this case, when the current controller opens the one power switch it controls, the phase current "freewheels" around the path provided by the other power switch and one of the power diodes 25a or 25b. The power switch controlled by the current controller 44 may equally well be either the "high-side" switch 8', the "low-side" switch 23', or may alternate between the high and low sides in any sequence.

Those skilled in the art will appreciate that modifications to the basic scheme such as those discussed above may affect the choice of slope compensation scheme (discussed earlier) if one is used.

The novel control circuit of FIG. 4 has several advantages over known current controllers. Initially, as discussed above, the circuit of FIG. 4 allows for control of the magnitude of the phase current and the switching frequency of switching devices 8' and 23' through the use of a single PWM signal. Moreover, the current controller of FIG. 4 is simple in that it implements the current control function without the need for minimum off-timers, separate clock oscillators or isolated current transducers such as are required by circuits of the type illustrated in FIGS. 1, 2, 3A and 3B. Additionally, in multi-phase systems where each phase is switching according to the frequency of the PWM signal received at node 40, the controller of FIG. 4 can reduce sources of acoustic noise in that all phases will be switched with the same frequency, thereby avoiding beating between the switching frequencies of the individual phases and the potential noise generated therefrom. Furthermore, because the switching frequency is fixed, it can be set to the minimum value required (for ultrasonic operation, for example) and the disadvantages of the higher than necessary average frequencies attendant with the prior art are therefore avoided.

Figure 5:
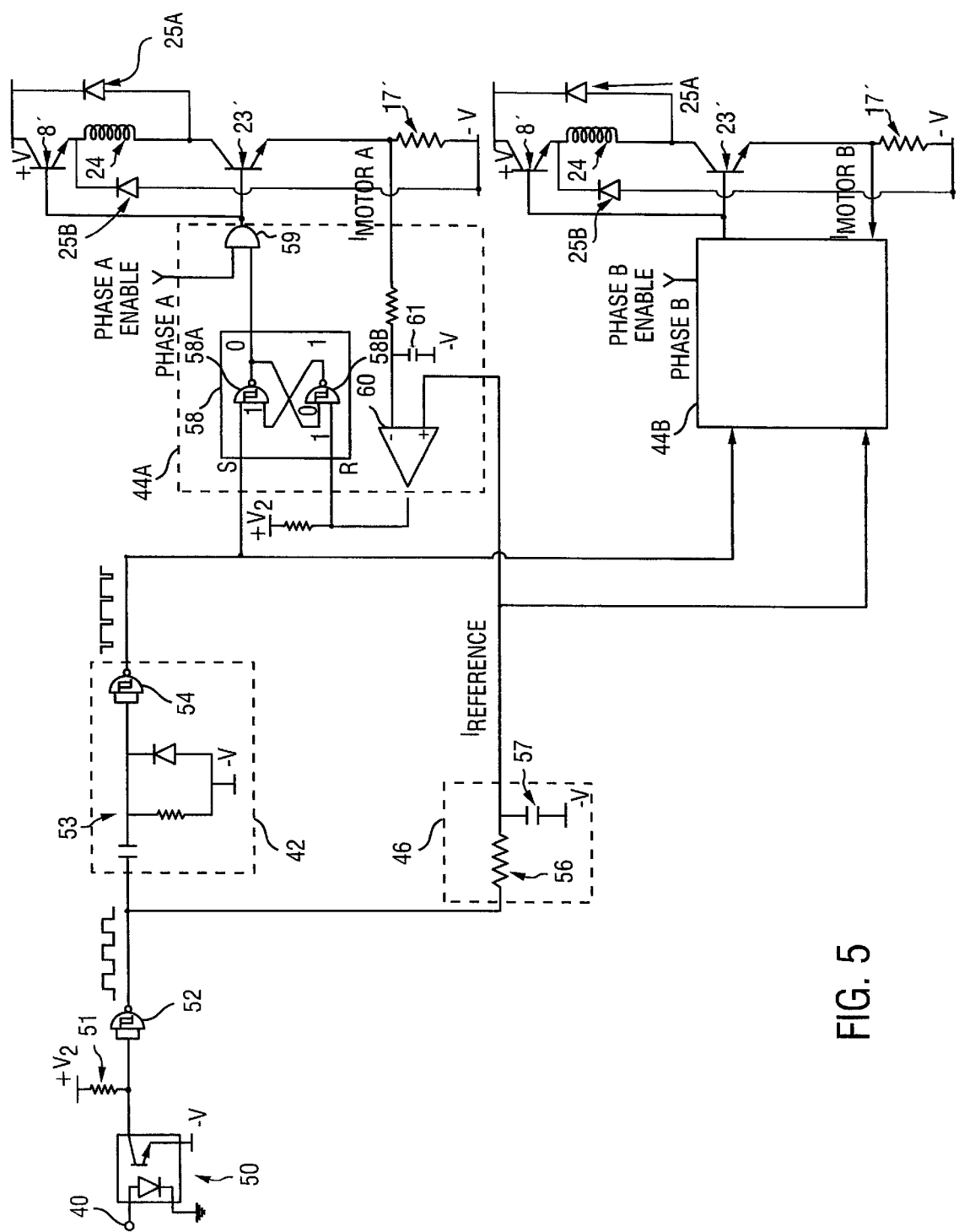
FIG. 5 illustrates in greater detail, one embodiment of the current controller of the present invention.

FIG. 5 illustrates in greater detail one embodiment of the current control circuit of the present invention. In general, FIG. 5 illustrates a control circuit in accordance with the present invention for a two phase switched reluctance motor.

Referring to FIG. 5, an input PWM signal is received at node 40 by an opto-isolator 50. The PWM signal received at node 40 may be generated by an ASIC, microprocessor or other digital controller used to control switched reluctance motors. The generation of the PWM input signal is not, per se, a part of the present invention and it is only necessary that the input PWM signal have: (i) a frequency component related to the desired switching frequency of switching devices 8' and 23'; and (ii) an average voltage (DC component) value related to the magnitude of the desired peak phase current. Circuits and methods for generating PWM signals with these characteristics are well-known in the art and are not discussed herein. In one embodiment of the present invention, the frequency of the input PWM signal is generated by a microcontroller and is set at or near 20 kHz to avoid the production of audible noise.

In the embodiment of FIG. 5 the output of opto-isolator 50 is coupled to a source of voltage +V$_2$ via a resistor 51 to produce a pulse train corresponding to the logical inverse of the PWM signal received at node 40. In the embodiment of FIG. 5 the pulse train from opto-isolator 50 is applied to both inputs of a hysteresis NAND gate 52 which again inverts the pulse train to provide a digital pulse train with well defined edges whose duty cycle and frequency correspond to the duty cycle and frequency of the PWM signal received at node 40.

The digital pulse train from hysteresis NAND gate 52 is applied to edge detection circuit 42 and to low pass filter circuit 46. In the embodiment of FIG. 5, the edge detection circuit 42, like the edge detection circuit of FIG. 4, provides a series of negative-going clock pulses that occur at the frequency of the rising edges of the PWM signal received at node 40. In FIG. 5, the edge detection circuit 42 comprises a RC filtering network 53 and an hysteresis NAND gate 54. The time duration of the negative-going clock pulses from edge detector 42 is not critical as long as the negative-going clock pulses are of a sufficient duration to set flip-flop 58, discussed below. The negative-going clock pulses from edge detector 42 must not, however, be so long that the pulse is still active when the current in the load 24 has reached the required peak value, or they will delay the reset of flip-flop 58 and cause the current to overshoot past the desired peak value. In practice, as will be explained, the set-dominant nature of flip-flop 58 means that the negative-going clock pulses can usefully be used to mask the effect of transient high peak currents due to diode recovery, which may flow through the current sense resistor 17' after the instant of turn-on of the switching devices 8' and 23'.

The inverted digital pulse train from hysteresis gate 52 is also applied to a low pass filter circuit 46. Like the low pass filter circuit 46 of FIG. 4, the low pass filter circuit 46 in the embodiment of FIG. 5 receives the PWM signal and provides an analog voltage signal I$_{REFERENCE}$ that is proportional to the duty cycle of the PWM signal. In the embodiment of FIG. 5, low pass filter 46 comprises a filtering network including a resistor 56 and a capacitor 57.

The negative-going clock pulses from edge detector 42 and the current reference signal I$_{REFERENCE}$ from low pass filter 46 are applied as inputs to phase current controllers 44A (for Phase A) and 44B (for Phase B). In FIG. 5, only the circuitry for current controller 44A is shown in detail. It will be understood that the circuitry for current controller 44B is substantially the same. The current controllers 44A and 44B also receive phase enable signals (PHASE A ENABLE, PHASE B ENABLE) that identify, in one of the many ways known in the art, the appropriate phase for phase energization at any given time. The PHASE A ENABLE and PHASE B ENABLE signals are provided by circuitry (not shown) that monitors the rotor's position and provides signals indicative of the appropriate phase for energization.

Referring to current control circuit 44A, the negative-going clock pulses from edge detector 42 are applied to the SET input of a flip-flop 58 comprising two hysteresis NAND gates 58a and 58b. As illustrated in FIG. 5, flip-flop 58 sets (i.e. its output assumes a logical "HIGH" state) whenever the signal at the SET input S drops to zero and resets whenever the input at the RESET input R drops to zero. The output of flip-flop 58 is applied as one input to a phase select gate 59 whose other input is the PHASE A ENABLE signal, discussed above. When PHASE A is enabled, the output of flip-flop 58 drives power switching devices 8' and 23' which may be an IGBTs, MOSFETs, BJTs or similar controllable switching devices. Accordingly, when flip-flop 58 is set, its output will be at a logic high state and it will turn ON switching devices 8' and 23' connecting phase winding 24' to the power source that produces an increasing current in phase winding 24'. Conversely, when flip-flop 58 is reset, its output will be at a logic low state and it will turn OFF switching devices 8' and 23'.

The use of logic high and logic low states in conjunction with the flip-flop 58 to respectively turn ON and OFF the switching devices is exemplary only.

From FIG. 5 it may be observed that (assuming that the RESET input R is a logic 1) the flip-flop 58 is set each time a negative-going clock pulse is provided by edge detector 42. As discussed above, the negative-going clock pulses from edge detector 52 occur at the frequency of the PWM signal received at node 40. Accordingly, in the embodiment of FIG. 5, the switching devices 8' and 23' are turned ON at a frequency that corresponds to and is controlled by the frequency of the PWM signal received at node 40'.

Although the flip-flop 58 illustrated in FIG. 5 is triggered by a falling edge, embodiments can use a rising edge triggered flip-flop. Furthermore, the present invention is not limited to the use of SR flip-flops but can be implemented through the use of other digital latching devices.

Referring to FIG. 5 it may be noted that the flip-flop 58 is reset each time a falling edge occurs at its RESET input R (assuming that the SET input S is at logic 1). The RESET input R of flip-flop 58 is coupled to the output of a comparator 60 which receives two inputs. The positive input of comparator 60 is coupled to the output of low pass filter 46 and receives the analog signal I$_{REFERENCE}$, which corresponds to the peak magnitude of the desired phase current. As discussed above, the magnitude of the analog signal I$_{REFERENCE}$ is determined by and controlled by the duty cycle of the PWM signal received at node 40.

The negative-input terminal of comparator 60 is coupled to a current measuring sense resistor 17' that provides an analog voltage I$_{MOTOR-A}$ that is representative of the current flowing in Phase A of the motor. A similar current measuring sense resistor 17' is placed in series with Phase B of the motor and could be provided for each phase of a multi-phase switched reluctance motor. While the embodiment of FIG. 5 uses current measuring sense resistor 17' to generate a signal representative of the motor phase current, other current measuring devices, such as a Hall-effect device or a current transducer, may be used to equal effect.

Comparator 60 compares the motor phase current I$_{MOTOR-A}$ with the signal representing the desired peak current I$_{REFERENCE}$ and produces a logic low signal whenever the motor current I$_{MOTOR-A}$ exceeds the desired peak current I$_{REFERENCE}$. Since the output of comparator 60 is coupled to the RESET input R of flip-flop 58, the logic low signal from the comparator 60 will reset flip-flop 58, causing the output of flip-flop 58 to drop to a logic low level. This will turn OFF the switching devices 8' and 23'. However, it should be noted that flip-flop 58 is set-dominant, so that the RESET input is ineffective while the negative-going clock pulse generated by edge detector 42 is active (i.e. in a logical LOW condition). This may be put to advantageous use by making the length of the negative-going clock pulses equal to, or longer than, the reverse-recovery time of the power diode 25a. As is well known in the art, such power diodes take a small but significant period of time to recover their reverse-blocking capability, which may result in the current through the sense resistor 17' overshooting briefly to a high peak value following closure of the power switch 23'. To reduce the effect of such overshoot, it is common practice to fit a short time-constant filter such as that shown as 59 in FIG. 5. However, by suitable choice of negative-going clock pulse width, it is possible to reduce the degree of filtering, or even eliminate it altogether, with attendant advantages of better overall stability and control performance.

Edge detector 42, current controller 44A and low pass filter 46 operate to control the switching frequency of the switching devices and the magnitude of the phase current in the same manner described above in connection with the circuit of FIG. 4. In particular, node 40 receives a PWM signal that is applied to edge detector 42 and low pass filter 46. Edge detector 42 produces a digital pulse train of negative-going pulses that occur at the same frequency as the frequency of the PWM signal received at node 40. The digital pulse train from edge detector 42 is applied to the SET input S of flip-flop 58. Assuming that the RESET input R to flip-flop 58 is logic 1, each negative-going pulse will set flip-flop 58, causing its output to go logic high, which turns ON switching devices 8' and 23'. The switching devices couple the phase winding 24' to a power source and the current in the phase winding 24' rises until it exceeds the desired peak current $I_{REFERENCE}$. When the phase current $I_{MOTOR-A}$ exceeds the desired peak reference current $I_{REFERENCE}$, comparator 60 produces a low going pulse which resets flip-flop 58, which turns OFF switching devices 8' and 23'. Since the switching devices 8' and 23' are opened, the current in phase winding 24' will drop below the desired peak reference current $I_{REFERENCE}$, causing the output of comparator 60 to return to logic high. The cycle will repeat itself upon the next occurrence of the next negative-going pulse from edge detector 42.

Although the above example was provided in connection with the circuitry of FIG. 5 and Phase A, the circuit's operation would be the same for Phase B, except the Phase B current controller 44B and the switching devices and current sensor associated with Phase B would be used.

From an analysis of FIG. 5 it may be noted that switching devices 8' and 23' will be switched at a known frequency that is substantially the same as the frequency of the PWM input signal received at node 40. Thus, the single PWM input signal received at node 40 determines both the frequency and the duration of the voltage applied to the phase winding through switching devices 8' and 23'.

The circuit of FIG. 5 has several advantages over the prior art. In addition to all of the advantages discussed in connection with the circuitry of FIG. 4, the circuitry of FIG. 5 requires fewer isolation devices than required by many of the known systems. For example, referring to the known circuit of FIG. 1, three isolators are required for each phase of the winding, whereas the circuit of FIG. 5 only requires one isolator for all the phases of the machine that it controls.

In addition to limiting the required number of isolation devices, the embodiment of the present invention ensures that if the circuit providing the PWM signal received at node 40 fails, the system is left in a safe condition. For example, as discussed above in connection with FIG. 1, in known systems, the failure of the device providing the PWM current command signal in a state such that the PWM signal is always logic high can cause high, potentially damaging, phase currents to flow in the motor. In the embodiment of FIG. 5, if such a failure occurs, flip-flop 58 will be reset whenever the motor current $I_{MOTOR-A}$ exceeds the desired peak current $I_{REFERENCE}$. In the event of a failure of the PWM providing device, after the reset occurs and the switching devices are switched OFF, there will be no clock pulse from edge detector 42 to set the flip-flop 58 and turn ON the switching devices. Accordingly, failure of the device providing the PWM current command in the embodiment of the present invention illustrated in FIG. 5 results in a safe condition, with switching devices OFF.

Further, the circuit shown in FIG. 5 does not require an isolated current transducer, allowing the use of smaller and less costly methods of current measurement.

Figure 6A:
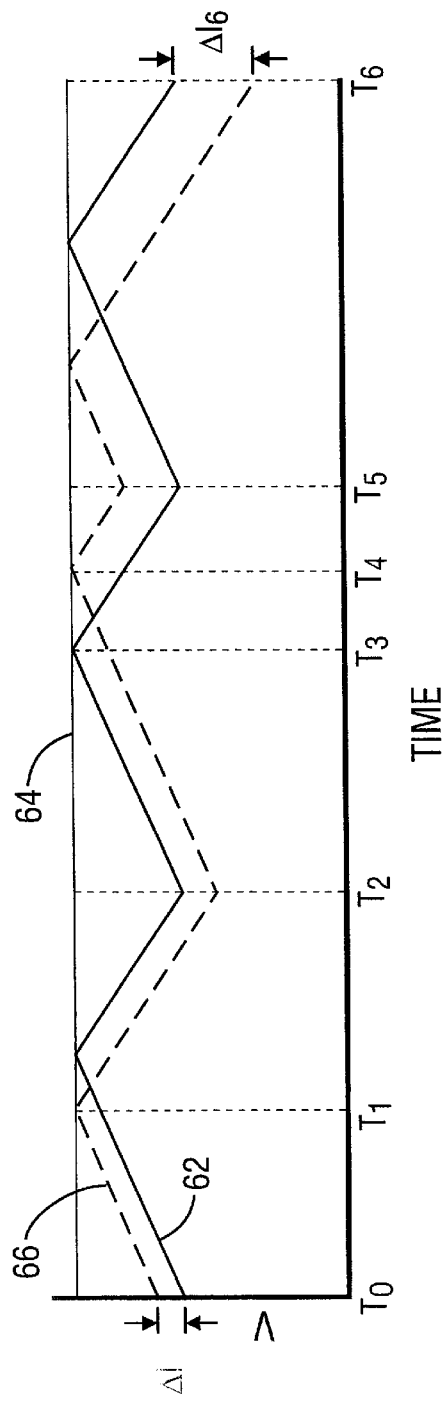
FIGS. 6A and 6B illustrate voltage waveforms demonstrating slope compensation.
Figure 6B:
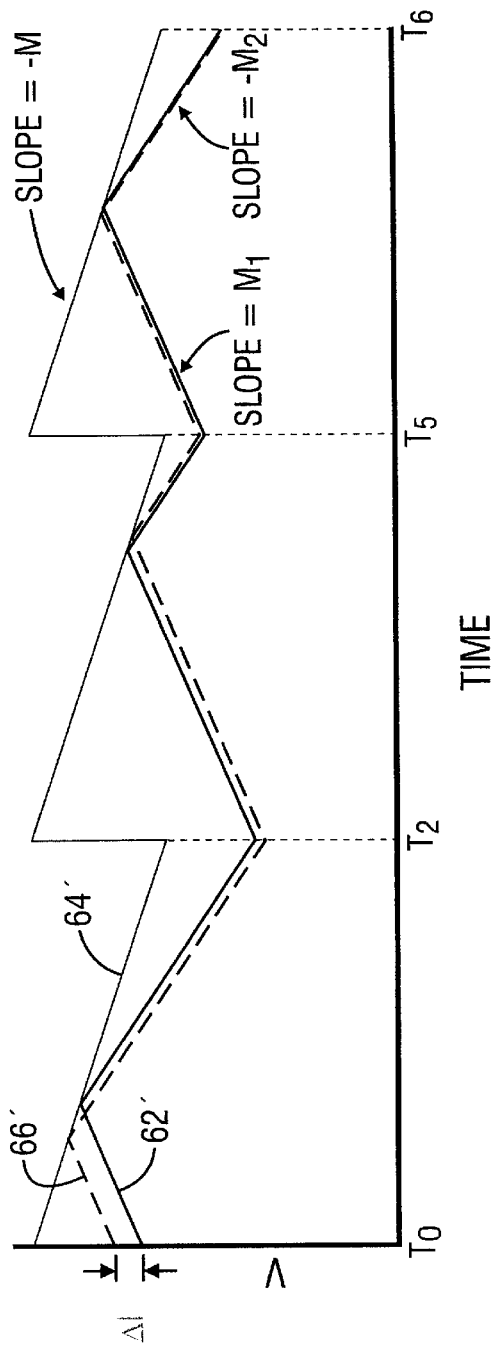

Slope compensation may be used to further improve the performance of the current control circuit of the present invention. FIGS. 6A and 6B help illustrate the basic concept of slope compensation.

FIG. 6A generally illustrates an analog voltage 62 corresponding to the phase current in the motor over time and a stable analog voltage 64 corresponding to the desired peak phase current. These voltages generally correspond to the $I_{MOTOR}$ and $I_{REFERENCE}$ signals discussed above. As illustrated in FIG. 6A, during normal operation of the current control circuit, the motor current 62 rises when the switches are closed until the phase current reaches the voltage representative of the desired peak current 64. At that time, the switches are opened and the current begins to fall until the phase winding is again coupled to the power source at time $T_2$.

If the voltage value representing the phase current is disturbed or perturbed by an amount $\Delta I$, e.g. by electrical "noise", an instability in the system may be introduced. This is illustrated by waveform 66 in FIG. 6A, which represents the voltage representative of the desired current with an error $\Delta I$ introduced at time $T_0$. As is illustrated in FIG. 6A the error is such that the voltage value representative of the phase current is increased by an amount $\Delta I$ at time $T_0$.

Because the voltage corresponding to the current is greater than it would otherwise be, the current appears to reach the desired peak current before it otherwise would and the switches are opened at time $T_1$ before they would have been if the error had not been present. The current in the phase winding will then decrease until time $T_2$ when the switches are switched on and the phase winding will again be coupled to the power source. It will be realized that in FIG. 6, the spacing of points $T_0$, $T_2$, $T_5$ and $T_6$ correspond to the constant frequency of the PWM input signal. Because the error caused the switches to be opened prematurely at $T_1$, the current at $T_2$ will be lower than it would otherwise be. Accordingly, the current seen by the comparator will take longer to rise to the desired peak current 64 than without the error, and will not reach the desired peak current 64 until $T_4$. The time $T_4$ is near the time $T_5$ which is the next time the switches are closed. The current at $T_5$ will still be near the desired peak current 64 and thus the switches will be opened before they would have been without the error. By the time $T_6$, the error $\Delta I$ has grown substantially and eventually it will become so large that the current cannot reach the desired peak value 64 within one PWM period. When this happens, the pulse which should set the flip-flop and turn on the power switches has no effect because the switches are already closed, the current having failed to reach the peak value during the previous clock period. The switching frequency is therefore no longer synchronized to the PWM signal and improper operation—not least audible noise—will result.

So-called "slope compensation" can be implemented by modifying, the voltage representing the desired peak current such that it varies over time at a frequency that corresponds to the PWM frequency. The use of slope compensation is illustrated by FIG. 6B, where the voltage representing the desired peak current is illustrated by waveform 64'. As waveform 64' illustrates, the desired peak current voltage is no longer constant, but varies linearly from a peak value to a minimum value over the periods, such as $T_0$ to $T_2$, defined by the switching of the power device.

When slope compensation is used, the current in the phase winding will vary generally as is illustrated by waveform 62' in FIG. 6B. As with the example of FIG. 6A, the current will increase until it reaches the desired peak current 64' at which point it will decrease until the switching devices are switched ON again. Waveform 66' represents a current waveform with an error ΔI introduced at time $T_0$. Following waveform 66' over time, it may be noticed that when slope compensation is used, the error ΔI decreases over time, tending to bring the system into stable operation.

The relative increase or decrease of the error value ΔI depends on the slopes of the waveforms illustrated in FIGS. 6A and 6B. For example, if it is assumed that the slopes of the increasing portions of the current waveform 62' are all constant at $M_1$ and the slopes of the decreasing portions of the current waveform 62' are all constant at $M_2$, it can be shown that the slope of the compensated voltage representing the desired peak current M must be at least $0.5M_2$ for stable operation. For the safest slope compensation, it has been determined that the slope of the compensated peak current voltage should be approximately equal to $M_2$. When $M=M_2$, any introduced error ΔI will be reduced to approximately zero after one switching cycle.

The slopes of the increasing and decreasing portions of the motor current waveform will be constant only if the voltage of the power source to which the phase winding is coupled is constant. In practical drives, the voltage of the power source is not constant, but can vary over time. Accordingly, for optimum motor performance, the slope of the compensated peak current voltage should not be constant but should vary with variations in the voltage of the power source. The present invention allows for the use of slope compensation, where the degree of compensation varies as a function of the voltage of the power supply voltage, +V.

In FIG. 6B slope compensation was introduced by adjusting the value of the voltage representing the desired peak current over time. Alternatively, slope compensation could have been introduced by allowing the voltage representative of the desired peak current $I_{REFERENCE}$ to remain constant and adding a compensation voltage to the voltage representing the motor current $I_{MOTOR}$ where the added compensation voltage varies over the switching period. To implement slope compensation such as is illustrated in FIG. 6B, the added compensation should start at near zero and increase linearly at a slope of M until the start of the next switching period at which time the compensation voltage drops to near zero and the process is repeated.

Figure 7A:
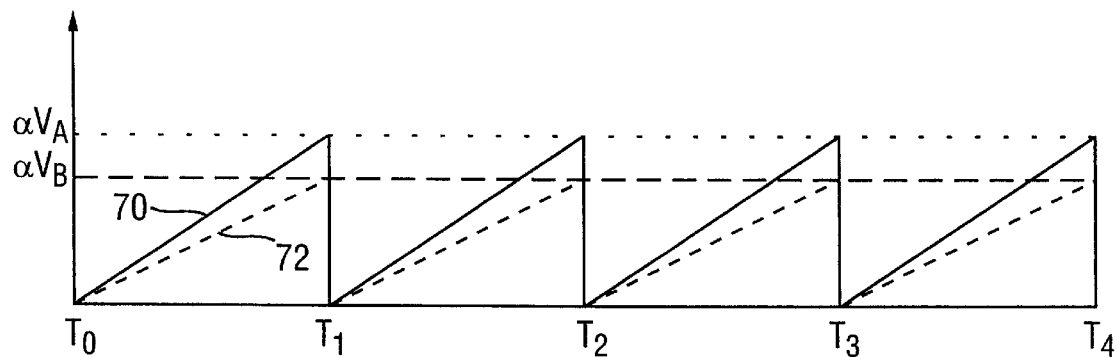
FIGS. 7A, 7B and 7C generally illustrate waveforms and circuitry constructed in accordance with the present invention that may be used to implement slope compensation that tracks the voltage of the power supply in the present invention.
Figure 7B:
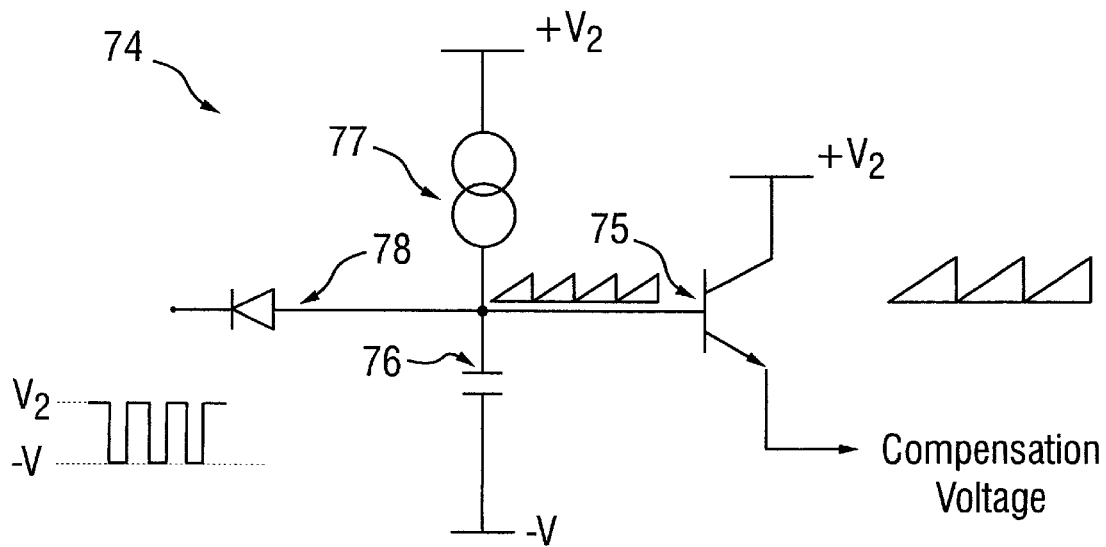

FIGS. 7A and 7B generally illustrate circuitry, and the associated waveforms, that may be used to implement slope compensation that tracks the voltage of the power supply by providing a voltage that varies from near zero to a maximum value over the switching period and adding that compensation voltage to the voltage representing the motor current $I_{MOTOR}$.

FIG. 7A provides voltage waveforms representing exemplary compensation voltages for different power supply voltage levels. Waveform 70 in FIG. 7A represents an exemplary compensation voltage for a power supply with a voltage of $V_A$. As illustrated, waveform 70 starts at a voltage near zero at the initiation of the switching period at time $T_0$ and increases linearly to a maximum value at time $T_1$ at which time the compensation voltage drops to near zero and the cycle repeats over the next switching cycle. In FIG. 7A, the maximum voltage magnitude of the compensation voltage is proportional to the voltage of the power supply $V_A$ but does not necessarily equal $V_A$.

Waveform 72 in FIG. 7A illustrates an exemplary compensation voltage for a power supply with a voltage of $V_B$. In this example $V_B$ is less than $V_A$. In order to properly adjust for the diminished supply voltage, the compensation voltage should increase more slowly over time, and the maximum compensation voltage level should be less than the maximum compensation voltage level for the higher supply voltage $V_A$. As FIG. 7A illustrates, waveform 72 has these characteristics in that it varies more slowly over time than waveform 70, and has a lower maximum voltage level than the maximum voltage level of waveform 70. As with waveform 70, the maximum voltage level of waveform 72 is proportional to the $V_B$ voltage of the power supply, but does not necessarily equal $V_B$. Both waveforms, 70 and 72, repeat at a frequency that is equal to the switching frequency of the power device.

FIG. 7B generally illustrates a slope compensation circuit 74 that provides a compensation voltage at the emitter of transistor 75 that approximately follows the voltages 70 and 72 of FIG. 7A. Coupled to the collector of transistor 75 is the power supply, $+V_2$. Transistor 75 provides a voltage at its emitter that corresponds to the voltage applied to the base of the transistor 75.

The base of transistor 75 is coupled to a ramp generator comprising capacitor 76, a current source 77, and a diode 78. The anode of the diode 78 is coupled to the junction of capacitor 76 and the current source 77. The cathode of diode 78 is coupled to a source of negative-going pulses that occur at the switching frequency of the power switching device. The current source 77 is coupled to the power supply $+V_2$. The current source 77 may be implemented using a transistor or other current regulating device, e.g., a constant current diode.

In operation, the current source 77 charges capacitor 76 to produce a ramp voltage that is applied to the base of transistor 75. This, in turn, will control the conductivity of transistor 75 to produce a ramp voltage at the emitter of transistor 75.

Figure 7C:
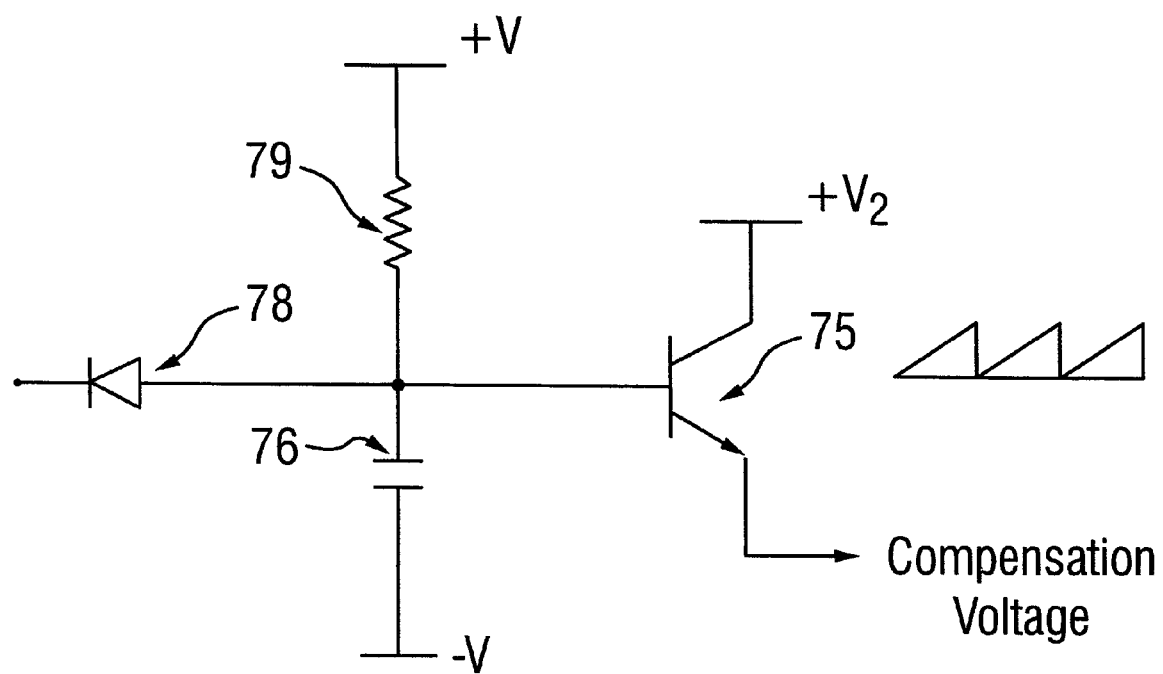

The slope of the ramp voltage provided at the emitter of transistor 75 is proportional to the slope of the ramp voltage applied to the base of transistor 75 (which is the voltage across the capacitor 76). The slope of the ramp voltage produced across capacitor 76 is proportional to the rate at which capacitor 76 is charged, which, in turn, is proportional to the magnitude of the current from current source 77. If the magnitude of the current supplied by current source 77 is constant, the slope of the ramp voltage of capacitor 76 will also be constant. If the magnitude of the current from source 77 is made to vary in proportion to the voltage of the supply +V, the slope of the ramp voltage provided to the base of transistor 75—and thus the slope of the compensation voltage at the emitter of the transistor 75—will increase as the supply voltage +V increases and decrease when +V decreases. In this manner, the slope of the compensation voltage can be adjusted to cope with variations in the voltage of the supply +V. One method of making the magnitude of the current going into the capacitor 76 proportional to the supply +V is to use a resistor 79 as shown in FIG. 7C. In many applications, the supply voltage +V will be large relative to the voltages associated with the slope compensating circuit and the current in resistor 79 will be approximately constant irrespective of the variations in potential at the base of the transistor 75.

Capacitor 76 will continue to charge, and the voltage across capacitor 76 will continue to rise, until a negative-going pulse is applied to diode 78. When a negative-going pulse is applied to the cathode of diode 78, it will be rendered conductive and capacitor 76 will rapidly discharge through diode 78, thus bringing the voltage across capacitor 76 and the voltage applied to the gate of transistor 75 to near zero. As discussed above, the negative-going pulses applied to the cathode of diode 78 occur at the switching frequency. In this manner, the circuit of FIG. 7B causes the compensation voltage to vary at the switching frequency.

Referring to FIG. 7C, as discussed above, the ramp voltage across capacitor 76 is applied to the base of transistor 75. The voltage produced at the emitter of transistor 75 will be a compensation voltage having a slope that varies according to the slope of the ramp voltage applied to the base. This slope is, in turn, determined approximately by the magnitude of the power supply voltage +V which is applied to the upper terminal of resistor 79, assuming that +V is large compared with the voltage at the base of transistor 75. In this manner, the circuit of FIG. 7B automatically adjusts the slope of the compensation voltage to adjust for variations in the supply +V.

Figure 8:
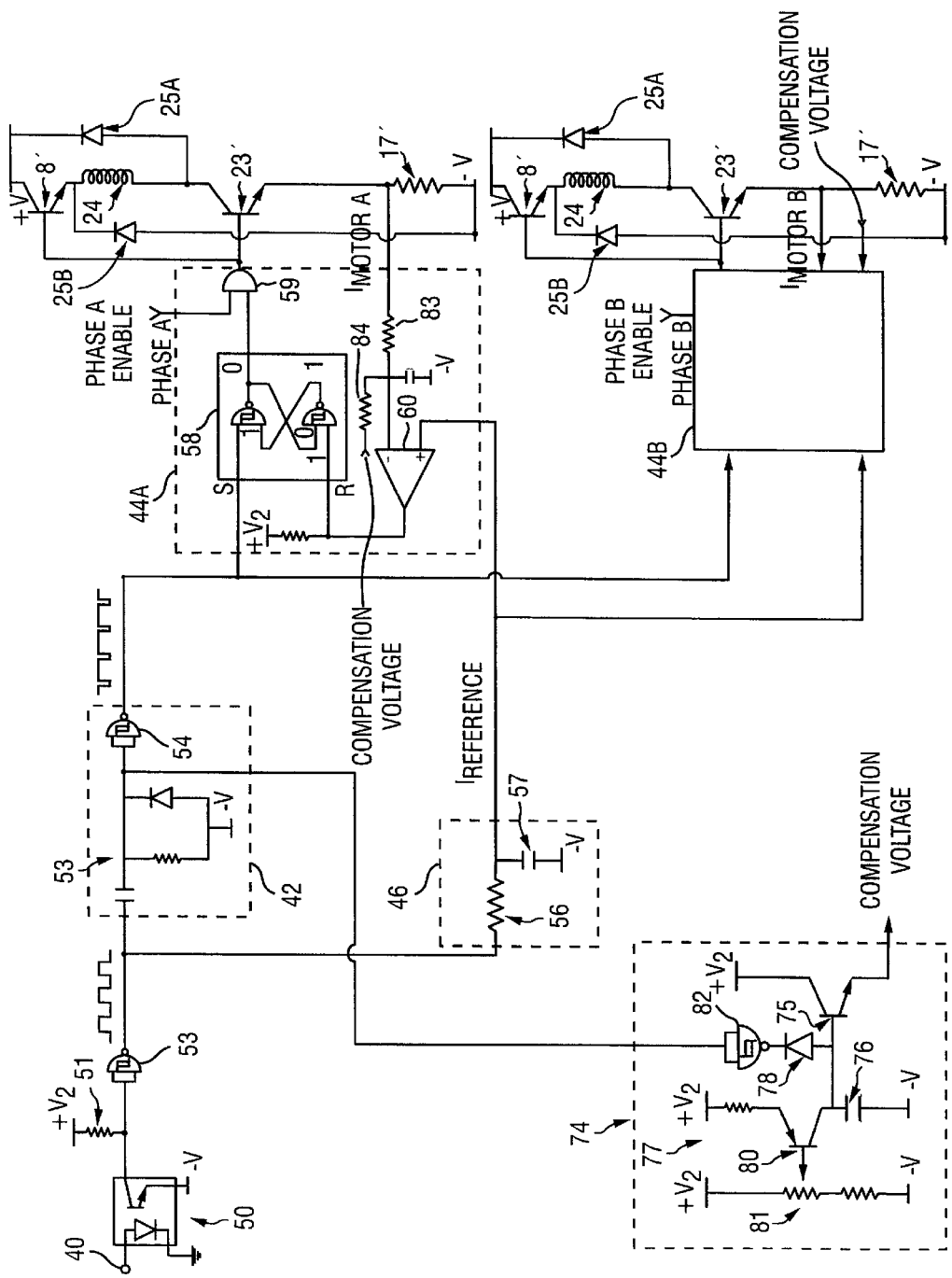
FIG. 8 illustrates in greater detail the use of a slope compensation circuit in accordance with the present invention in the context of the current controller of FIG. 5.

FIG. 8 illustrates in greater detail the use of a slope compensation circuit 74 in the context of the current control circuit of FIG. 5. Except as affected by the compensation circuit 74, the circuit of FIG. 8 operates in substantially the same manner as the circuit previously described in connection with FIG. 5.

Referring to FIG. 8, the slope compensation circuit 74 comprises transistor 75, capacitor 76, current source 77 and diode 78. These elements function substantially as discussed above in connection with FIG. 7B. In the embodiment of FIG. 8, the current source 77 comprises a transistor 80, whose base is controlled by a pair of series connected resistors, including variable resistor 81. By adjusting the resistance of variable resistor 81, it is possible to adjust the slope of the compensation voltage at the emitter of the transistor 75.

As discussed above, the slope of the compensation voltage should be set such that, for some nominal power supply voltage +V, the slope M of the compensation voltage is at least $0.5M_2$ where $M_2$ is the slope of the decreasing portion of the motor current voltage $I_{MOTOR}$. As further discussed above, if the slope of the compensation voltage is adjusted such that $M=M_2$, both the slope M of the compensation voltage and the slope of the decreasing portion of the motor current voltage $I_{MOTOR}$ will vary in proportion to one another. This is believed to be beneficial in that both M and $M_2$ will vary in proportion to variations in +V.

In the embodiment of FIG. 8 a hysteresis NAND gate 82 is also provided. NAND gate 82 is coupled to the edge detector 42 and operates with edge detector 42 to produce a series of negative-going clock pulses that have a frequency corresponding to the frequency of the PWM signal received at node 40. Alternative embodiments are envisioned where NAND gate 82 is eliminated and the diode 78 is coupled to the output of edge detector 42 that is coupled to flip-flop 58. In such an embodiment, hysteresis NAND gate 54 should be sized to sink the charge from capacitor 76.

The compensation voltage from slope compensation circuit 74 is added to the voltage representing the motor current $I_{MOTOR}$ through the use of resistors 83 and 84. As illustrated in FIG. 8, the compensation voltage from compensation circuit 74 may be provided to the current control circuits for each phase of the motor.

Alternative embodiments of the slope compensation circuit are contemplated wherein ramp generating circuitry is adjusted to produce a compensation voltage that starts at zero at the initiation of a switching period and decreases linearly according to a slope −M. In such an embodiment, the compensation voltage would be added to the voltage representing the desired peak current $I_{REFERENCE}$ to provide slope compensation.

When slope compensation is used in connection with the current controller of the present invention, it is recommended that the low pass filter 46 be selected such that the ripple on the analog voltage representative of the desired peak current $I_{REFERENCE}$ is small. Too much ripple could affect the operation of the slope compensation circuitry.

In general, the low pass filter should ensure that any ripple on the $I_{REFERENCE}$ voltage signal is much less than 0.10 times the peak motor current. For example, ripples with magnitudes of approximately 1/50th of the peak current or 1/100th of the peak current are believed to be acceptable.

In the embodiment of FIG. 5, the low pass filter 46 comprises a first order RC low pass filter comprising a single resistor and a single capacitor. Depending on the frequency of the PWM signal received at node 40, the required current control bandwidth, and the peak magnitude of the motor current, it may be desirable to use more complicated or higher order low pass filters. Examples of such alternative low pass filters are illustrated in FIGS. 9A and 9B.

Figure 9A:
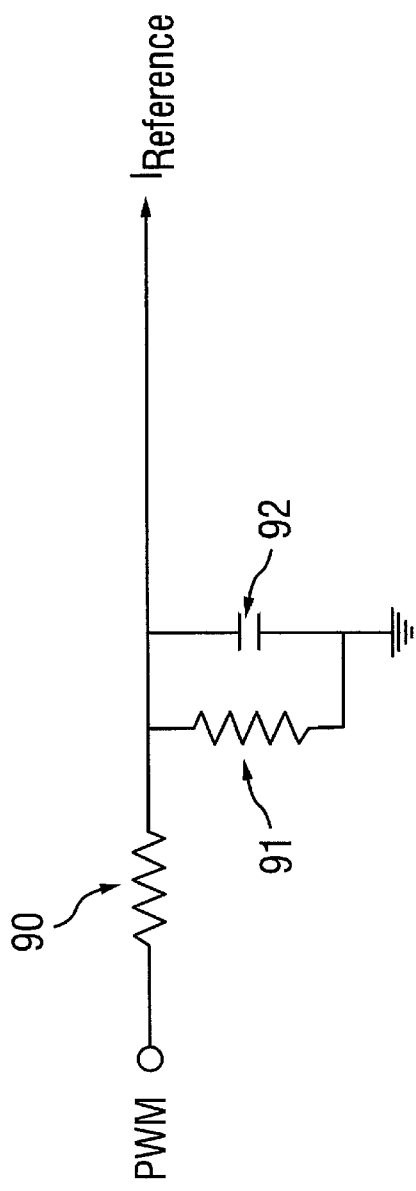
FIGS. 9A and 9B illustrate examples of alternative low pass filters that may be used to provide a current reference signal in the current controllers constructed in accordance with the present invention.

FIG. 9A illustrates a low pass filter more complicated than that of FIG. 5 that comprises two resistors 90 and 91 and a capacitor 92. The values of the resistors 90 and 91 should vary with the frequency of the PWM signal and the magnitude of the peak motor current.

Figure 9B:
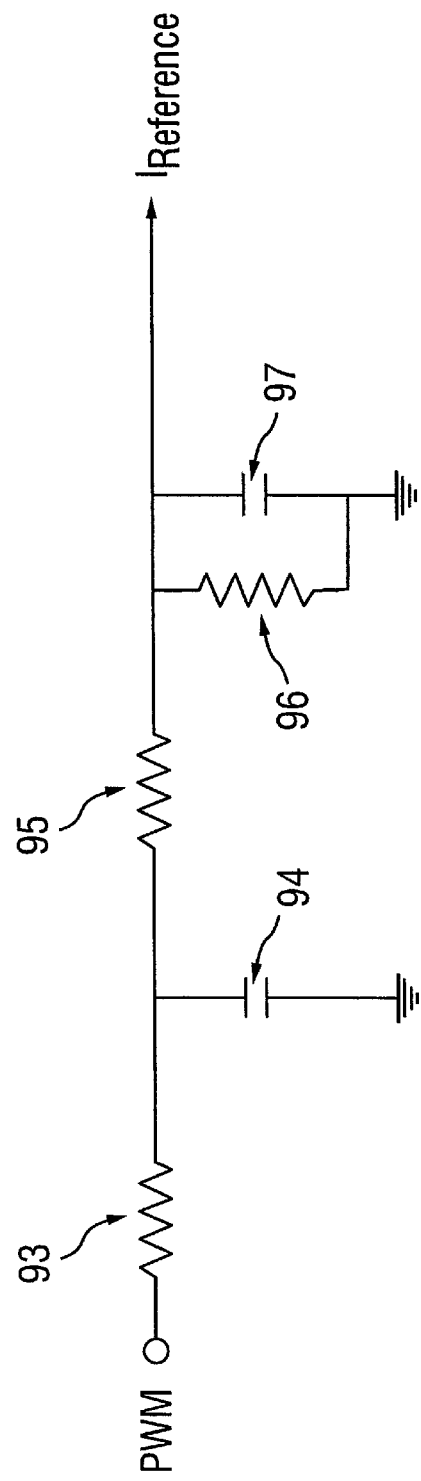

FIG. 9B illustrates a higher order low pass filter that may be used in the present invention. The higher order low pass filter of FIG. 9B comprises a first RC network comprising resistor 93 and capacitor 94 electrically coupled in series with a second RC network comprising resistors 95 and 96 and capacitor 97. As with the resistors and capacitor of FIG. 9A, the component values of FIG. 9B should be selected in light of the frequency of the PWM signal, the required current control bandwidth and the peak motor current. As an example, for a PWM frequency of 10 kHz the values of the components of FIG. 9A may be as follows: resistor 93=16k Ohms; capacitor 94=10 nanofarads; resistor 95=82k Ohms; resistor 96=20k Ohms and capacitor 97=10 nanofarads. These values are exemplary and other values may be used.

While the invention has been described in connection with the illustrative embodiments discussed above, those skilled in the art will recognized that many variations may be made without departing from the present invention. For example, the embodiment of FIG. 4 illustrates the use of upper and lower power switching devices 8 and 23. Alternatively, embodiments are envisioned wherein the switching OFF of the switching devices is not simultaneous and a freewheeling mode is introduced into the switching cycle, or wherein upper switching device 8 is eliminated and a single switching device 23 is used.

In a still further embodiment, the isolator, edge detector circuit and low pass filter are duplicated for each phase, thereby allowing control of the current in each phase to individual levels. Those skilled in the art will recognize that the techniques and circuits described above can be applied with equal effect to a drive system operating in the generating mode.

Accordingly, the above description of several embodiments is made by way of example and not for purposes of limitation. The present invention is intended to be limited only by the spirit and scope of the following claims.

What is claimed is:

1. A method of controlling the magnitude of current in a winding of a reluctance machine and the switching frequency of a power switching device in response to a series of pulses, the method comprising the steps of:

deriving a signal representative of the desired phase current from the series of pulses;

switching the power switching device to couple the phase winding to a power supply in response to a pulse from the series of pulses;

monitoring the current in the phase winding to provide a signal representative of the phase current;

comparing the signal representative of the phase current with the signal representative of the desired phase current; and switching OFF the power switching device when the signal representative of the phase current exceeds the signal representative of the desired phase current.

2. The method of claim 1 wherein the power switching device is switched to couple the phase winding to the power supply in response to the rising edge of the said pulse from the series of pulses.

3. The method of claim 1 wherein the power switching device is switched to couple the phase winding to the power supply in response to the falling edge of the said pulse from the series of pulses.

4. The method of claim 1 wherein the signal representative of the desired phase current is derived by filtering the series of pulses.

5. A control system for providing power device switching signals to control current in a phase winding of a reluctance machine in response to a series of control pulses having a duty cycle and a repetition frequency, the control system comprising:

an edge detector having an input arranged to receive the control pulses and to provide a series of clock pulses, the clock pulses occurring at a frequency that is proportional to the repetition frequency of the control pulses;

a circuit arranged to receive the control pulses and to provide a reference signal that is related to the duty cycle of the control pulses;

a current monitor arranged to provide a signal representative of the phase current; and a current controller coupled to receive the clock pulses from the edge detector, the reference signal from the circuit, and the signal representative of the phase current from the current monitor, the current controller comprising a comparator that compares the reference signal with the signal representative of the phase current in the phase winding, the current controller providing a switching signal that has a first state and a second state, wherein the first state is initiated by a clock pulse and terminated when the comparator indicates that the signal representative of the phase current is greater than the reference signal.

6. The control system of claim 5 wherein the circuit comprises a low pass filter.

7. The control system of claim 6 wherein the low pass filter comprises a resistor and capacitor filtering network.

8. The control system of claim 5 wherein the filter comprises a low pass filter including a first resistor and capacitor filtering network coupled in series with a second resistor and capacitor filtering network.

9. The control system of claim 5 wherein the edge detector provides a clock pulse in response to the rising edge of a control pulse.

10. The control system of claim 5 wherein the edge detector provides a clock pulse in response to the falling edge of a control pulse.

11. The control system of claim 5 wherein the input of the edge detector comprises a high pass filter and the an output of the filter is electrically coupled to both inputs of a NAND gate.

12. The control system of claim 5 wherein the clock pulses provided by the edge detector are initiated by a falling edge and terminated by a rising edge.

13. The control system of claim 5 wherein the current controller comprises a flip-flop, the flip-flop having a SET input and RESET input, wherein the SET input of the flip-flop is electrically coupled to receive the clock pulses from the edge detector, wherein the RESET input of the flip-flop is electrically coupled to receive the output of the comparator, and wherein the output of the flip-flop determines the state of the switching signal.

14. The control system of claim 5 wherein the current monitor comprises a current transducer.

15. The control system of claim 5 wherein the current monitor comprises a current measuring sense resistor connected in series with the phase winding.

16. A control system for controlling electric current in an inductive load in response to a series of control pulses having a duty cycle and a frequency, the system comprising:

means for generating a reference signal in response to the series of pulses, where the reference signal corresponds to the duty cycle of the series of pulses;

means for generating a series of switching signals in response to the series of pulses, where the frequency of the series of switching signals corresponds to the frequency of the series of pulses;

means for providing a signal representative of the load current; and means responsive to the reference signal, the series of switching signals, and the signal representative of the load current for actuating a power switching device coupled to the load and a source of electric power to cause the load current to increase in response to a switching signal and to actuate the switching device to cause the load current to decrease when the signal representative of the load current exceeds the reference signal.

17. The control system of claim 16 wherein the inductive load is a phase winding in a reluctance machine.

\* \* \* \* \*